US008533094B1

(12) United States Patent
Dorr

(10) Patent No.: US 8,533,094 B1
(45) Date of Patent: Sep. 10, 2013

(54) ON-LINE AUCTION SALES LEADS

(75) Inventor: Robert C. Dorr, Pueblo, CO (US)

(73) Assignee: eBay Inc., San Jose, CA (US)

( * ) Notice: Subject to any disclaimer, the term of this patent is extended or adjusted under 35 U.S.C. 154(b) by 2694 days.

(21) Appl. No.: 09/769,546

(22) Filed: Jan. 24, 2001

Related U.S. Application Data

(60) Provisional application No. 60/178,147, filed on Jan. 26, 2000.

(51) Int. Cl.
*G06Q 40/00* (2012.01)

(52) U.S. Cl.
USPC .............................................. 705/37; 705/35

(58) Field of Classification Search
USPC ................................. 705/35, 37, 26
See application file for complete search history.

(56) References Cited

U.S. PATENT DOCUMENTS

| | | | |
|---|---|---|---|
| 4,996,642 A | 2/1991 | Hey | |
| 5,583,763 A * | 12/1996 | Atcheson et al. | 707/750 |
| 5,749,081 A | 5/1998 | Whiteis | |
| 5,790,426 A | 8/1998 | Robinson | |
| 6,041,311 A | 3/2000 | Chislenko et al. | |
| 6,047,264 A * | 4/2000 | Fisher et al. | 705/26.44 |
| 6,049,777 A | 4/2000 | Sheena et al. | |
| 6,055,513 A * | 4/2000 | Katz et al. | 705/26.41 |
| 6,064,980 A | 5/2000 | Jacobi et al. | |
| 6,085,229 A | 7/2000 | Newman et al. | |
| 6,092,049 A | 7/2000 | Chislenko et al. | |
| 6,101,486 A * | 8/2000 | Roberts et al. | 705/14.66 |
| 6,246,997 B1 | 6/2001 | Cybul et al. | |
| 6,266,649 B1 | 7/2001 | Linden et al. | |
| 6,317,722 B1 | 11/2001 | Jacobi et al. | |
| 6,356,879 B2 | 3/2002 | Aggarwal et al. | |
| 6,370,513 B1 | 4/2002 | Kolawa et al. | |
| 6,415,270 B1 * | 7/2002 | Rackson et al. | 705/37 |
| 6,484,149 B1 | 11/2002 | Jammes et al. | |
| 6,587,838 B1 * | 7/2003 | Esposito et al. | 705/26 |
| 6,615,247 B1 * | 9/2003 | Murphy | 709/217 |
| 6,636,836 B1 | 10/2003 | Pyo | |
| 6,754,636 B1 * | 6/2004 | Walker et al. | 705/50 |
| 6,772,150 B1 | 8/2004 | Whitman et al. | |
| 6,785,671 B1 | 8/2004 | Bailey et al. | |
| 6,801,909 B2 | 10/2004 | Delgado et al. | |
| 6,813,775 B1 | 11/2004 | Finseth et al. | |
| 6,853,982 B2 | 2/2005 | Smith et al. | |

(Continued)

OTHER PUBLICATIONS

"U.S. Appl. No. 10/263,224 Final Office Action mailed Jun. 25, 2007", 9 pgs.

(Continued)

*Primary Examiner* — Lalita M Hamilton
(74) *Attorney, Agent, or Firm* — Schwegman Lundberg & Woessner, P.A.

(57) ABSTRACT

A method for generating on-line sales leads in an on-line auction. The method determines when a prospective bidder for an on-line auction of a specific item by a seller accesses the on-line screen for the item. The method obtains the e-mail address of the prospective bidder and either correlates the e-mail address of the prospective bidder with the item by seller or with a classification for the item. The correlated e-mail address is then delivered to the seller or to a purchaser and may be accompanied with information identifying the specific item, the classification, whether a bid was made or not, etc. Furthermore, the delivery occurs at periodic fixed time intervals or when a fixed number of e-mail addresses are obtained.

21 Claims, 4 Drawing Sheets

(56) References Cited

U.S. PATENT DOCUMENTS

| | | |
|---|---|---|
| 6,865,546 B1 | 3/2005 | Song |
| 6,963,850 B1 * | 11/2005 | Bezos et al. .................... 705/26 |
| 7,016,863 B1 * | 3/2006 | Kamakura et al. ............... 705/26 |
| 7,110,967 B1 * | 9/2006 | Espenes et al. ............. 705/26.2 |
| 7,613,633 B1 * | 11/2009 | Woolston ..................... 705/26.3 |
| 8,275,673 B1 | 9/2012 | Poon |
| 2001/0021914 A1 | 9/2001 | Jacobi et al. |
| 2001/0021921 A1 | 9/2001 | Kan et al. |
| 2001/0037259 A1 | 11/2001 | Sharma et al. |
| 2001/0054021 A1 | 12/2001 | Kawakura et al. |
| 2002/0010625 A1 | 1/2002 | Smith et al. |
| 2002/0022994 A1 | 2/2002 | Miller et al. |
| 2002/0026386 A1 | 2/2002 | Walden |
| 2002/0052873 A1 | 5/2002 | Delgado et al. |
| 2002/0055890 A1 | 5/2002 | Foley |
| 2002/0062268 A1 | 5/2002 | Sato et al. |
| 2002/0065760 A1 | 5/2002 | Wiesehuegel et al. |
| 2002/0065877 A1 | 5/2002 | Kowtko et al. |
| 2002/0099629 A1 | 7/2002 | Sato et al. |
| 2002/0103692 A1 | 8/2002 | Rosenberg et al. |
| 2002/0138331 A1 | 9/2002 | Hosea et al. |
| 2002/0147628 A1 | 10/2002 | Specter et al. |
| 2002/0161664 A1 | 10/2002 | Shaya et al. |
| 2002/0174428 A1 | 11/2002 | Agnihotri et al. |
| 2002/0198882 A1 | 12/2002 | Linden et al. |
| 2003/0028427 A1 | 2/2003 | Dutta et al. |
| 2003/0037041 A1 | 2/2003 | Hertz |
| 2003/0051240 A1 | 3/2003 | Schaffer et al. |
| 2003/0069740 A1 | 4/2003 | Zeidman |
| 2003/0084450 A1 | 5/2003 | Thurston et al. |
| 2003/0093793 A1 | 5/2003 | Gutta |
| 2003/0105682 A1 | 6/2003 | Dicker et al. |
| 2003/0110056 A1 | 6/2003 | Berghofer et al. |
| 2003/0131070 A1 | 7/2003 | Stroebel et al. |
| 2003/0145326 A1 | 7/2003 | Gutta et al. |
| 2003/0182249 A1 | 9/2003 | Buczak |
| 2003/0208399 A1 | 11/2003 | Basak et al. |
| 2003/0217332 A1 | 11/2003 | Smith et al. |
| 2003/0233655 A1 | 12/2003 | Gutta et al. |
| 2004/0039657 A1 | 2/2004 | Behrens et al. |
| 2004/0078214 A1 | 4/2004 | Speiser et al. |
| 2004/0143450 A1 | 7/2004 | Vidali |
| 2004/0230499 A1 | 11/2004 | Stack |
| 2004/0267613 A1 | 12/2004 | Chan et al. |
| 2005/0028207 A1 * | 2/2005 | Finseth et al. .................. 725/46 |
| 2005/0038717 A1 | 2/2005 | McQueen et al. |
| 2005/0055713 A1 | 3/2005 | Lee et al. |
| 2012/0296764 A1 | 11/2012 | Poon et al. |

OTHER PUBLICATIONS

"U.S. Appl. No. 10/263,224 Final Office Action mailed Aug. 1, 2005", 11 pgs.

"U.S. Appl. No. 10/263,224 Non Final Office Action mailed Jan. 26, 2006", 12 pgs.

"U.S. Appl. No. 10/263,224 Non Final Office Action mailed Mar. 8, 2005", 19 pgs.

"U.S. Appl. No. 10/263,224 Non Final Office Action mailed Jun. 19, 2006", 16 pgs.

"U.S. Appl. No. 10/263,224 Non Final Office Action mailed Dec. 13, 2006", 11 pgs.

"U.S. Appl. No. 10/263,224 Response filed Mar. 13, 2007 to Non Final Office Action mailed Dec. 13, 2006", 13 pgs.

"U.S. Appl. No. 10/263,224 Response filed May 6, 2005 to Non Final Office Action mailed Mar. 8, 2005", 14 pgs.

"U.S. Appl. No. 10/263,224 Response filed May 9, 2006 to Non Final Office Action mailed Jan. 26, 2006", 15 pgs.

"U.S. Appl. No. 10/263,224 Response filed Sep. 18, 2006 to Non Final Office Action mailed Jun. 19, 2006", 14 pgs.

"U.S. Appl. No. 10/263,224 Response filed Nov. 14, 2005 to Final Office Action mailed Aug. 1, 2005", 15 pgs.

Lin, Weiyang, et al., "Efficient Adaptive-Support Association Rule Mining for Recommender Systems", *Data Mining and Knowledge Discovery*, 6(1), (2001), 83-105.

"U.S. Appl. No. 10/263,224, Appeal Brief filed Sep. 19, 2007", 25 pgs.

"U.S. Appl. No. 10/263,224, Appeal Decision mailed Aug. 24, 2011", 8 pgs.

"U.S. Appl. No. 10/263,224, Non Final Office Action mailed Feb. 12, 2012", 11 pgs.

"U.S. Appl. No. 10/263,224, Reply Brief filed Jan. 17, 2008", 5 pgs.

"U.S. Appl. No. 10/263,224, Examiner Interview Summary mailed May 23, 2012", 10 pgs.

"U.S. Appl. No. 10/263,224, Notice of Allowance mailed May 23, 2012", 15 pgs.

"U.S. Appl. No. 10/263,224, Response filed May 3, 2012 to Non Final Office Action mailed Feb. 28, 2012", 14 pgs.

"U.S. Appl. No. 13/565,661, Non Final Office Action mailed Dec. 5, 2012", 10 pgs.

* cited by examiner

ON-LINE AUCTION SALES LEADS

RELATED INVENTION

This application claims priority to Provisional Patent Application, Ser. No. 60/178,147, filed Jan. 26, 2000 and entitled "ON-LINE AUCTION SALES LEADS."

BACKGROUND OF THE INVENTION

Field of the Invention

The present invention relates to on-line auctioning.

STATEMENT OF THE PROBLEM

On-line auctioning is becoming a popular vehicle for auctioning items. Indeed, more and more, retail (i.e., brick and mortar) businesses are moving into the on-line auction service as a legitimate retail sales vehicle.

When individuals bid on a particular item from a retail business occasionally such on-line auctioning retailers will contact the actual bidders on that item so as to solicit selling other items by encouraging them to visit a web site or to encourage them to bid on other items that they are auctioning.

In the world of direct mail marketing, it is well known that people who express an interest in a certain type of direct mail catalog have a propensity to buy that type of product or service. Hence, those individuals become a valuable mailing list contact for sales leads to other companies in the same or related retail sales areas.

A need exists to provide a service to retail sales organizations that use on-line auction services to generate sales leads.

SUMMARY OF THE INVENTION

The present invention solves this need by providing a unique and novel method for generating sales leads based upon not only actual bidders to an item being auctioned but also to those prospective bidders that visit the web page for an item being auctioned.

A method for generating on-line sales leads in an on-line auction is set forth. The method determines when a prospective bidder for an on-line auction of a specific item by a seller accesses the screen for the item. The method obtains the e-mail address of the prospective bidder and either correlates the e-mail address of the prospective bidder with the item or with a classification for the item. The correlated e-mail address is then delivered to the seller or to a purchaser and may be accompanied with information identifying the specific item, the classification, whether a bid was made or not, etc. Furthermore, the delivery occurs at periodic fixed time intervals or when a fixed number of e-mail addresses are obtained.

DETAILED DESCRIPTION OF THE INVENTION

The present invention provides the on-line auction service with the opportunity to increase its revenue stream by determining prospective bidders that access the web page for an item being auctioned and then to assemble a list of the prospective bidders information into a file for delivery to the entity auctioning the item off or other entities interested in the identity of such prospective bidders. A prospective bidder has already registered with the on-line auction service and is able, if he/she so chooses, to bid on an item of a seller being auctioned. A person who has not registered could view screens of items to be auctioned, but would not be a prospective bidder. Through registration, the prospective bidder agrees to the application of the present invention and, therefore, any privacy issues are contractually resolved.

Figure 1:
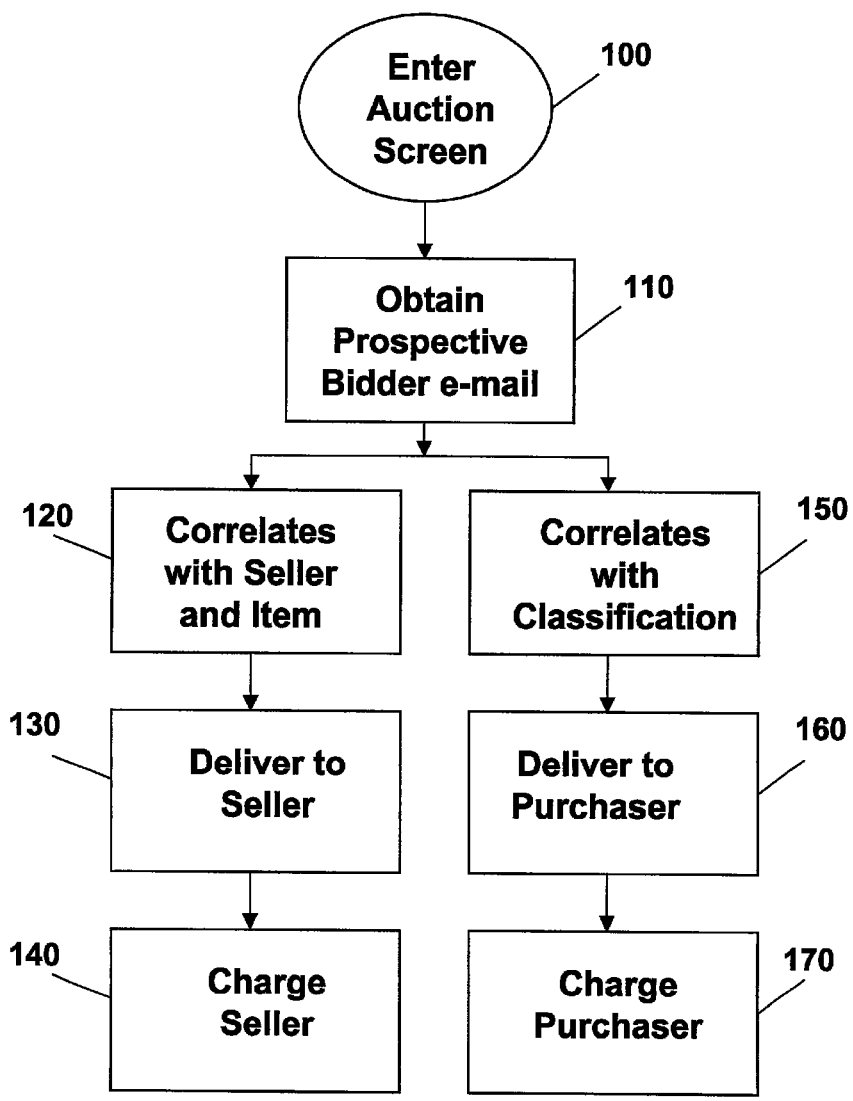
FIG. 1 sets forth the method of the present invention in one embodiment as a flow chart wherein sales leads are generated from on-line auctioning.
Figure 2:
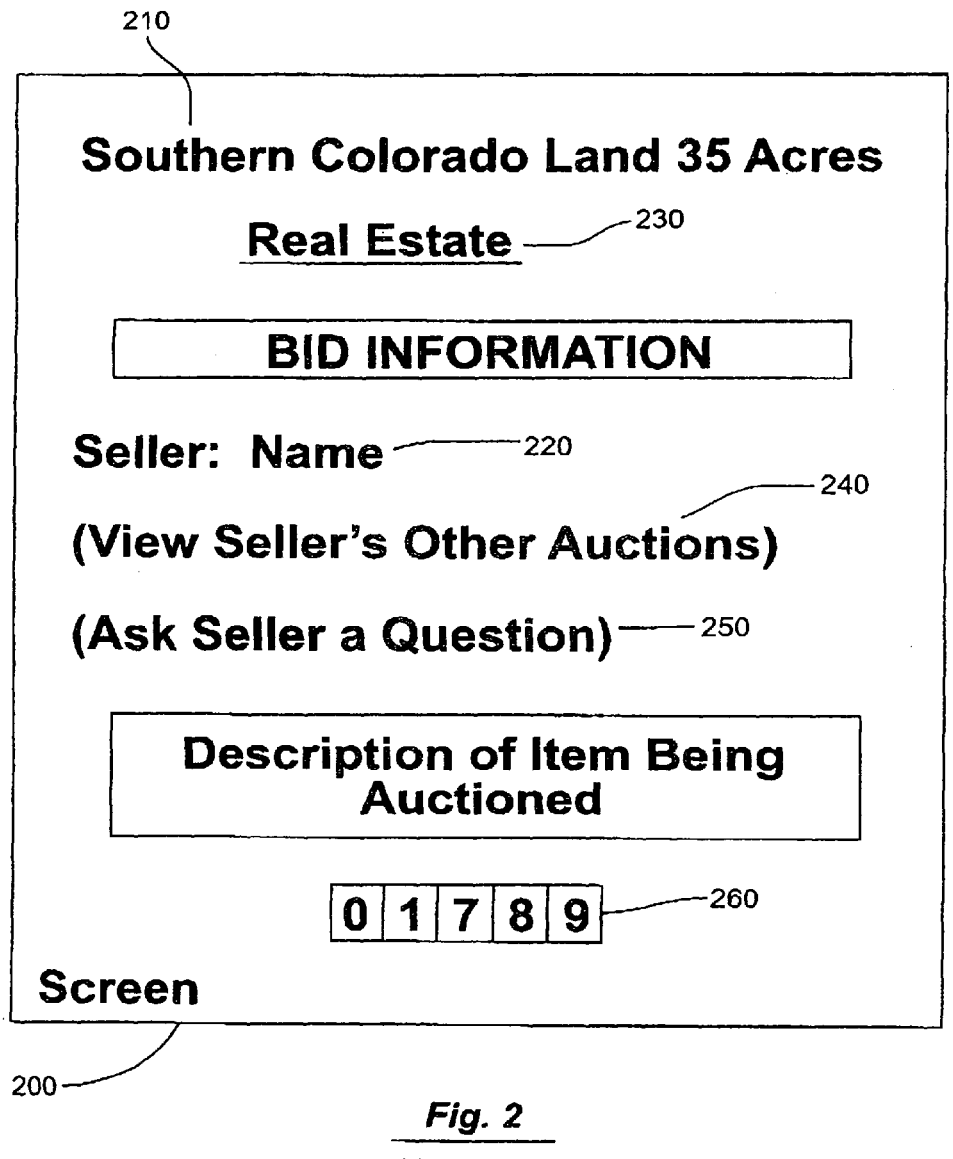
FIG. 2 sets forth a prior art screen display for the auction of an item.
Figure 3:
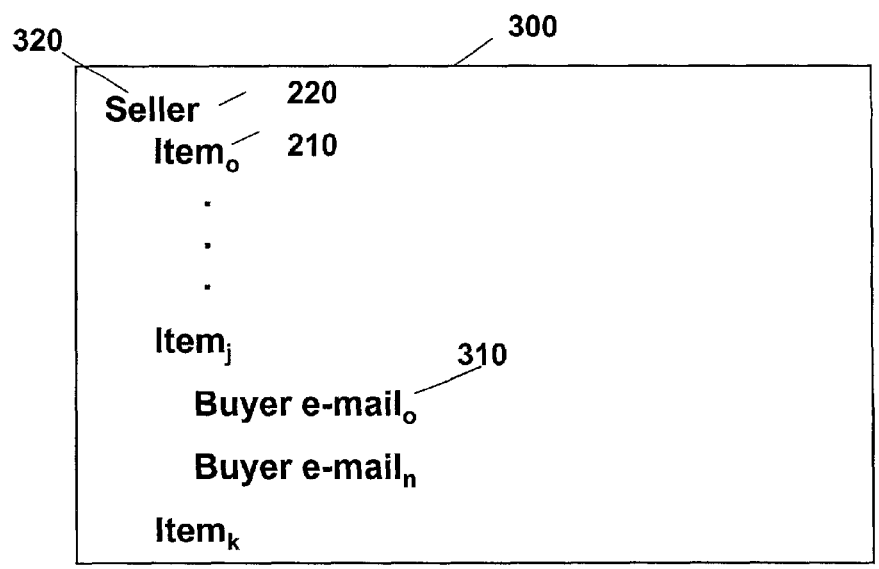
FIG. 3 sets forth a memory configuration for correlating prior e-mail addresses to a seller and to the items a seller is auctioning.

In FIG. 1 when a prospective bidder enters a particular auction screen 200, as for example shown in FIG. 2, for an item being auctioned, the method in stage 110 obtains the prospective bidder's e-mail address. This occurs in the software of system, not shown, of the on-line auction service. In stage 120 the method of the present invention correlates the prospective bidder's e-mail address obtained in stage 110 with the item 210 of the seller 220. In addition, it can also be correlated with the seller 220 and/or any other type of key word or number criteria such as classification words 230. Indeed, the seller 220 may have other items 240 being auctioned off and the seller can obtain the identity of all prospective bidders accessing the seller's other web pages for each of its items being auctioned even though the prospective bidder never places a bid. The seller 220 knows that this prospective bidder has expressed interest in this type of item 210 being sold. In FIG. 3, correlations occurring in stage 120 are stored in memory 300. It is to be expressly understood that any of a number of conventional approaches can be utilized for associating data sales such as seller identity 220, item field 210, and prospective buyer e-mail information 310.

In FIG. 3, the seller 220 has a number of separate items 210 for sale and the prospective bidder information 310 is accumulated under each different item. This provides important information to the seller. As indicated, those prospective buyers 310 that have expressed an interest in that type of item even though no bid was ever made. It is to be expressly understood that bidders who make actual bids could also have their e-mail addresses 310 inserted into memory 300 so that a seller 220 has a complete data file of not only prospective bidders, but also actual bidders. In the example of FIG. 2, no actual bids occurred with a time lapse of eight minutes and one second. Clearly under the conventional approach, a prospective bidder, even though not making a bid, can e-mail 250 a message to the seller and make further inquiries about the item being auctioned even though no bid is made. However, the seller 220 is denied the benefit of all the other prospective bidders who contact the web page may spend time reviewing it and then leave the web page without asking the seller a question 250. How important this service is to the on-line auction and to the seller 220 is indicated by the hit counter 260 for the item 210 which in the example of FIG. 2 shows 1,789 hits for that example. The seller 220 under the conventional approach is denied this information and under the teachings of the present invention receives significant and valuable information.

In stage 130, from time to time, the list of e-mail prospective sales leads (i.e., the correlated information obtained in stage 120) from memory 300 is delivered to the seller 220 in data format 320 or any other suitable format. This delivery can occur once a week, once a day, once a month, or whenever a predetermined number such as 100 is obtained. With the delivery to the seller 220 in stage 130 in stage 140 the seller is charged an appropriate fee for obtaining this information such as pennies per e-mail address, etc. Any suitable form of compensation can be utilized to charge the seller, but it is typically done automatically against the seller's credit card which is already on record with the on-line auctioning service.

Alternatively, and as shown in stage 150, the auction service has classification words 230 under which the items being auctioned are categorized. For example, the item 210 in FIG. 2 would be classified at eBay Inc. as follows: Miscellaneous: Real Estate. In stage 150, whenever a prospective bidder, whether or not they are actually making a bid, accesses an auction screen 200 based upon category classifications, the e-mail address is correlated with the classification language and is assembled. In stage 160 this information correlated in stage 150 is delivered to purchasers desiring such e-mail addresses based upon classification information. Again the compensation to the on-line service for this service can occur in stage 170 where the credit card of a purchase is automatically charged. Delivery occurs, as before, from time to time.

Figure 4:
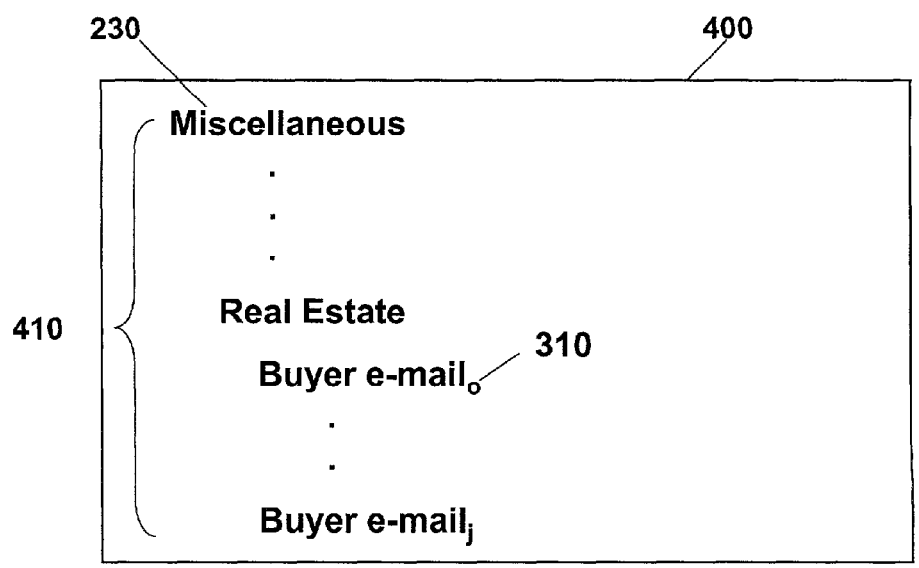
FIG. 4 sets forth a memory configuration for correlating buyer e-mail addresses to classification topics.

In FIG. 4, memory location 400 is shown wherein the classification words 230 are used as data fields into which the prospective buyer e-mail information 310 is inserted. This data list 410 is then delivered to purchasers as discussed above for FIG. 3.

It is to be expressly understood that memory 300 and 400 can be the same memory and that the data fields can be combined together. In this environment, it can be a conventional relational database. Prospective buyer information 310 can be accessed either by seller, by item, by classification word 230 or any combination thereof.

Figure 5:
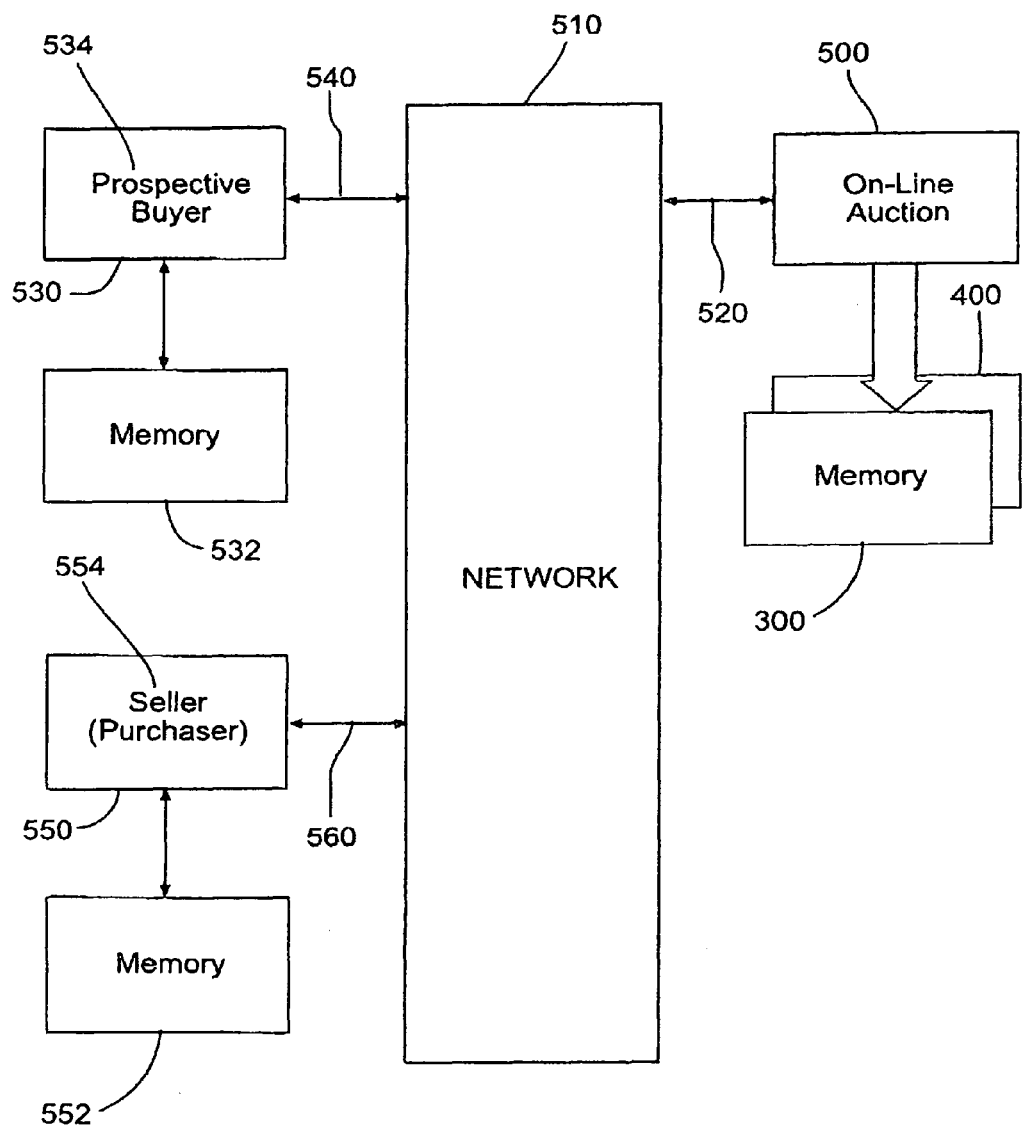
FIG. 5 sets forth the block diagram environment showing the operation of the present invention.

In FIG. 5, the block diagram environment showing the implementation of the method of the present invention is generally set forth. It is well within the skill of the art to set up Internet businesses including on-line auction services. An on-line auction service 500 is shown interconnected to a communications network 510 over connection 520. The communication network 510 can comprise many different components and is essentially transparent to the on-line auction service 500. Also connected to the communication network 510 is at least one prospective buyer computer 530 in communication with the network over communication link 540 and at least one seller computer 550 also in communication with the network 510 over communication link 560. Typically, the prospective buyer 534 and the seller 552 have home based or office based personal computers 530, 550, respectively which are readily available from a large number of sources. Each computer system 530 and 550 is conventionally interconnected to the network 510 over a suitable communication link 540, 560 such as a modem or a DSL line.

With reference back to FIG. 1, the seller 554 in a conventional fashion sets up an account with the on-line auction service 500 and creates a web page for an item such as shown in FIG. 2. The on-line auction service 500 then sets up the memory field shown in FIG. 3 for memory 300 for the seller and for the item so that when a prospective buyer such as buyer 534 accesses the on-line auction web site his/her e-mail address is recorded and stored in memory 300. This occurs in stages 100, 110, and 120, as previously discussed. Subsequently, it is then delivered from memory 300 to the seller's computer 550 and into the seller's memory 552. Subsequently, the seller 554 independent of the on-line service 500 can deliver an e-mail direct advertisement directly to the prospective buyer's computer 530 which is conventionally stored in an internal memory 532. It is to be understood and as shown in FIG. 5 that the purchaser can be in the position of the seller with a computer system 550 to open up an account with the on-line auction service 500 so that memory files 400 are generated as shown in FIG. 4 for that purchaser for subsequent delivery into the purchaser's memory 552.

Hence, what has been shown and described above is a convenient method for providing sales leads to the retailers that have products or services in these specific classification categories. To provide sellers and/or purchasers with e-mail contact to persons that have already expressed an interest in that type of product or service. Furthermore, it provides a convenience source of revenues to the on-line service.

A method for generating on-line sales leads in an on-line auction is set forth. The method determines when a prospective bidder for an on-line auction of a specific item by a seller accesses the screen for the item. The method obtains the e-mail address of the prospective bidder. The determination and the obtaining can occur in any order. The method then correlates the e-mail address of the prospective bidder with the item or with a classification for the item. The correlated e-mail address is then delivered to the seller of the item or to a purchaser and may be accompanied with information identifying the specific item, the classification, whether a bid was made or not, etc. Furthermore, the delivery occurs at periodic fixed time intervals or when a fixed number of e-mail addresses are obtained.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

I claim:

1. A method comprising:
   using a processor to perform operations comprising:
   detecting an action by a prospective buyer with respect to an auction screen of on an on-line auctioning service, the action not including an explicit expression of an interest by the prospective buyer in an item associated with the auction screen;
   generating a sales lead pertaining to items included in a classification of items, the generating of the sales lead based on the detecting of the action by the prospective buyer, the classification of items selected based on keywords associated with the item, the sales lead including information about the prospective buyer that has not been provided to a seller of items associated with the classification of items;
   delivering the sales lead to the seller based on an identification of an interest by the seller in the information about the prospective buyer; and
   charging the seller for the delivering of the sales lead.

2. The method of claim 1, wherein the information includes an email address of the prospective buyer.

3. The method of claim 1, wherein the item is land and the classification of the items is real estate.

4. The method of claim 1, wherein the delivering of the information is based on a generating of a fixed number of additional sales leads pertaining to the classification of the items, each of the additional sales leads including information about an additional prospective buyer that has not been provided to the seller.

5. The method of claim 1, wherein the delivering of the information is based on a periodic fixed time interval.

6. The method of claim 1, wherein the information includes an identification of the item.

7. The method of claim 1, wherein the delivering of the sales lead to the seller includes providing the seller with an accumulation of the information and the additional information under the item and the additional items.

8. A system comprising:
at least one processor; and
an on-line auction service implemented by the at least one processor and configured to:
  detect an action by a prospective buyer with respect to an auction screen of on an on-line auctioning service, the action not including an explicit expression of an interest by the prospective buyer in an item associated with the auction screen;
  generating a sales lead pertaining to items included in a classification of items, the generating of the sales lead based on the detecting of the action by the prospective buyer, the classification of items selected based on keywords associated with the item, the sales lead including information about the prospective buyer that has not been provided to a seller of items associated with the classification of items;
  deliver the sales lead to the seller based on an identification of an interest by the seller in the information about the prospective buyer; and
  charge the seller for the delivering of the sales lead.

9. The system of claim 8, wherein the information includes an email address of the prospective buyer.

10. The system of claim 9, wherein the delivering of the information is based on a generating of a fixed number of additional sales leads pertaining to the classification of the items, the additional sales leads including additional information about additional prospective buyers that has not been provided to the seller.

11. The system of claim 10, wherein the delivering of the sales lead to the seller includes providing the seller with an accumulation of the information and the additional information under the item and the additional items.

12. The system of claim 8, wherein the item is land and the classification of the items is real estate.

13. The system of claim 8, wherein the on-line auction service is further configured to deliver the information based on a periodic fixed time intervals.

14. The system of claim 8, wherein the information includes an identification of the item.

15. A non-transitory computer-readable medium comprising a set of instructions that, when executed by at least one processor of a computer system, cause the computer system to perform operations comprising:
  detecting an action by a prospective buyer with respect to an auction screen of on an on-line auctioning service, the action not including an explicit expression of an interest by the prospective buyer in an item associated with the auction screen;
  generating a sales lead pertaining to items included in a classification of items, the generating of the sales lead based on the detecting of the action by the prospective buyer, the classification of items selected based on keywords associated with the item, the sales lead including information about the prospective buyer that has not been provided to a seller of items associated with the classification of items;
  delivering the sales lead to the seller based on an identification of an interest by the seller in the information about the prospective buyer; and
  charging the seller for the delivering of the sales lead.

16. The non-transitory computer-readable medium of claim 15, wherein the information includes an email address of the prospective buyer.

17. The non-transitory computer-readable medium of claim 16, wherein the delivering of the information is based on a generating of a fixed number of additional sales leads pertaining to the classification of the items, the additional sales leads including additional information about additional prospective buyers that has not been provided to the seller.

18. The non-transitory computer-readable medium of claim 15, wherein the item is land and the classification of the items is real estate.

19. The non-transitory computer-readable medium of claim 15, wherein the delivering of the information is based on a periodic fixed time intervals.

20. The non-transitory computer-readable medium of claim 15, wherein the information includes an identification of the item.

21. The non-transitory computer-readable medium of claim 15, wherein the delivering of the information is based on a generating of a fixed number of additional sales leads pertaining to the classification of the items, the additional sales leads including additional information about additional prospective buyers that has not been provided to the seller.

* * * * *